UNITED STATES PATENT OFFICE.

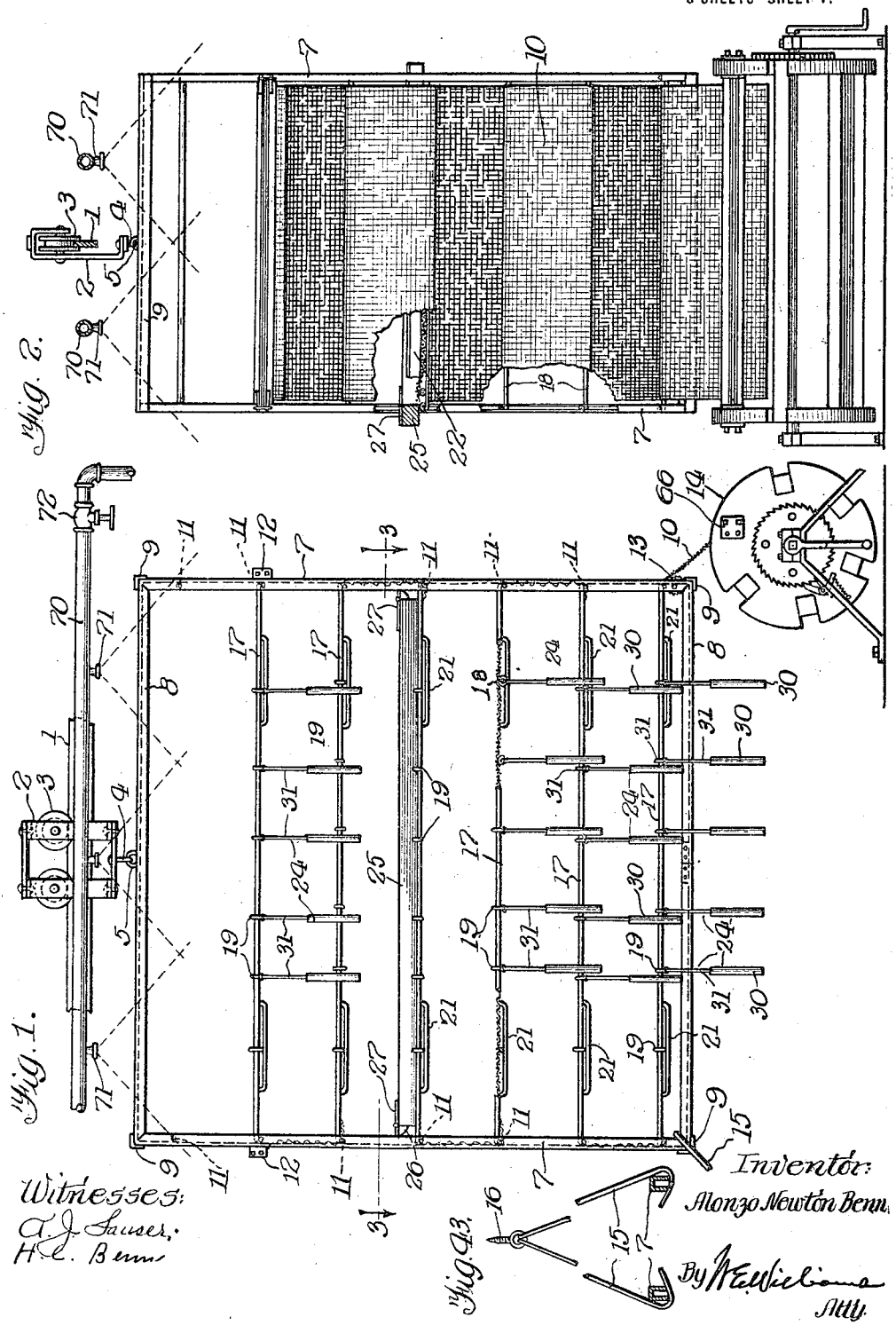

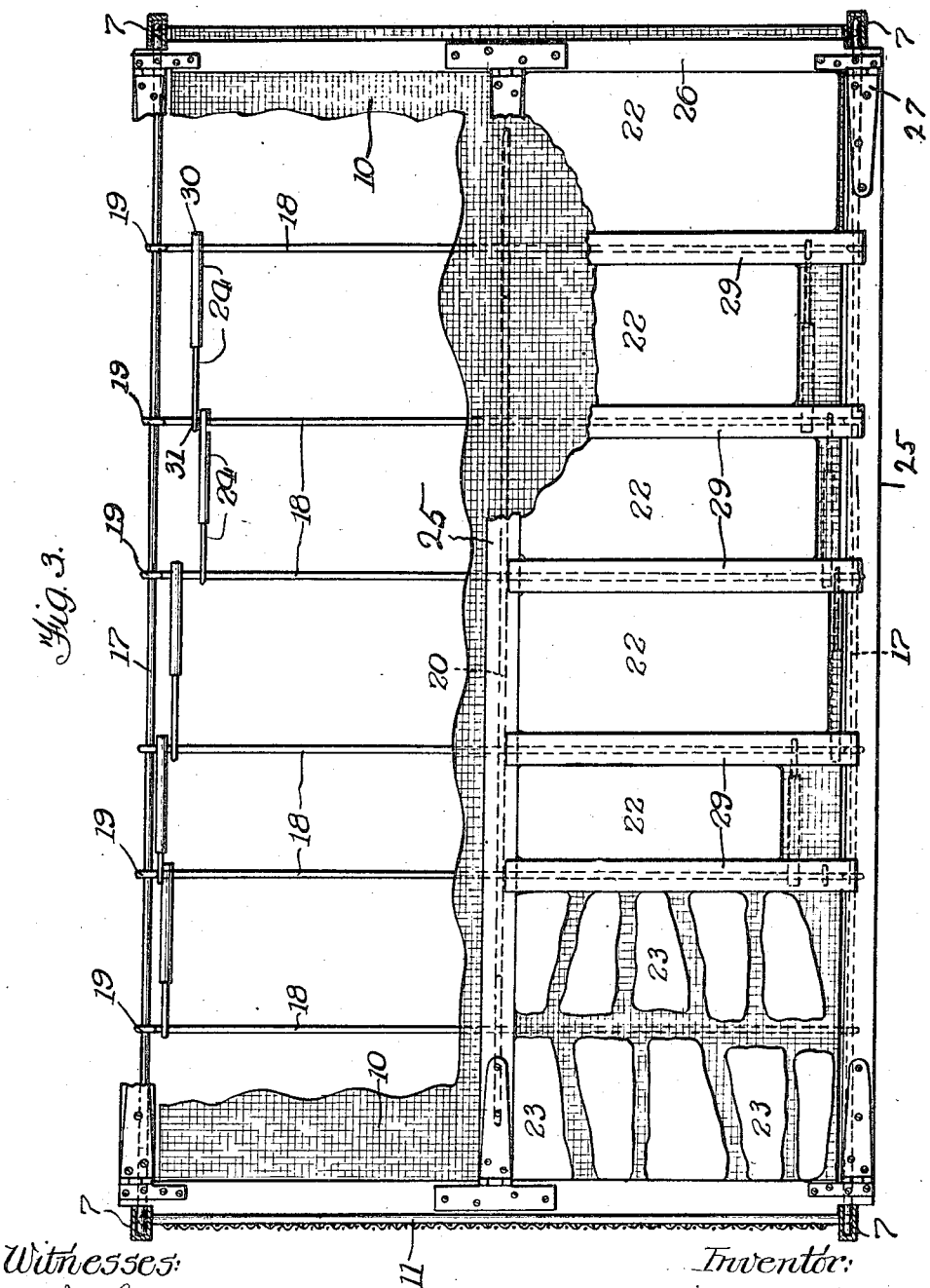

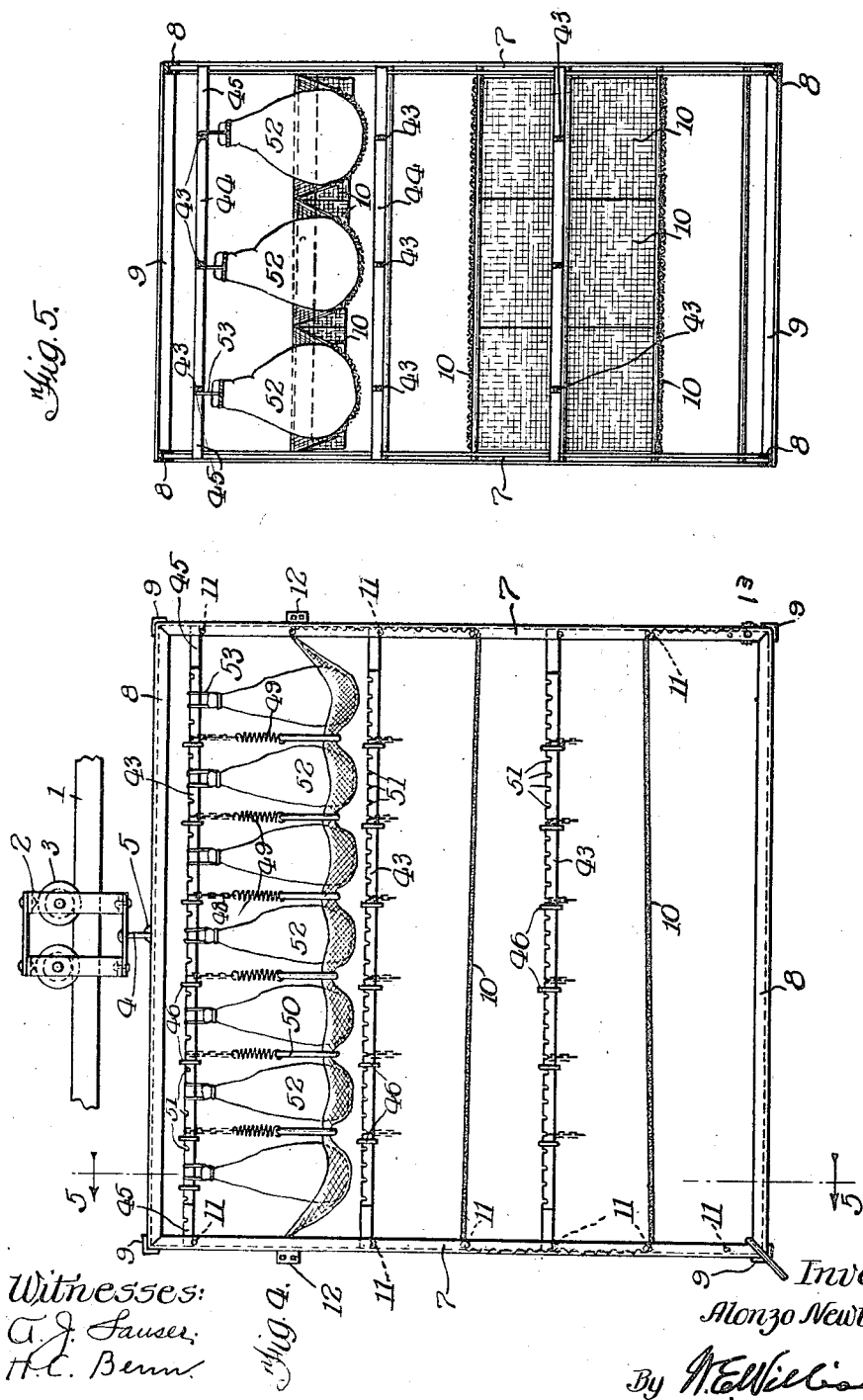

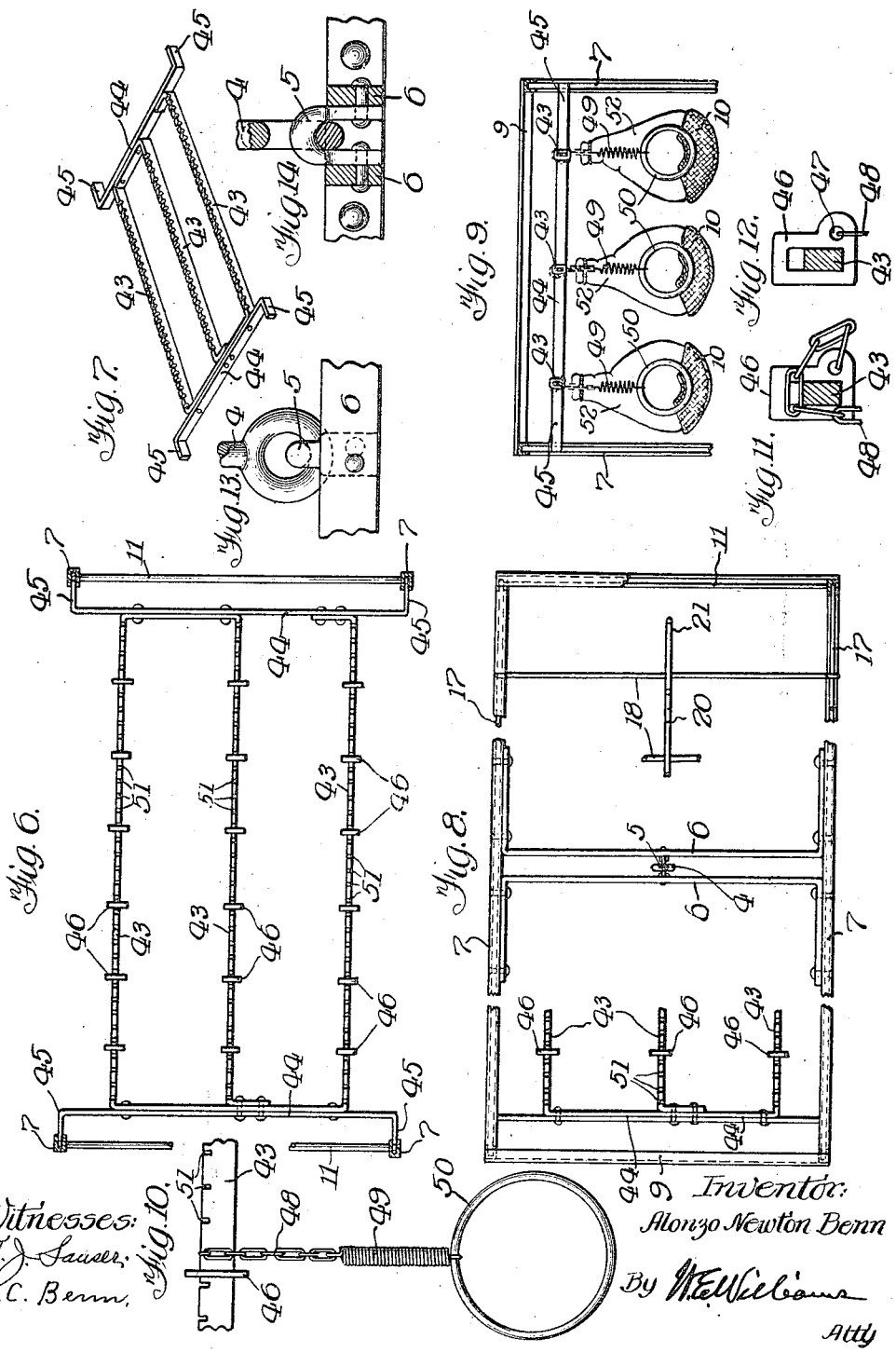

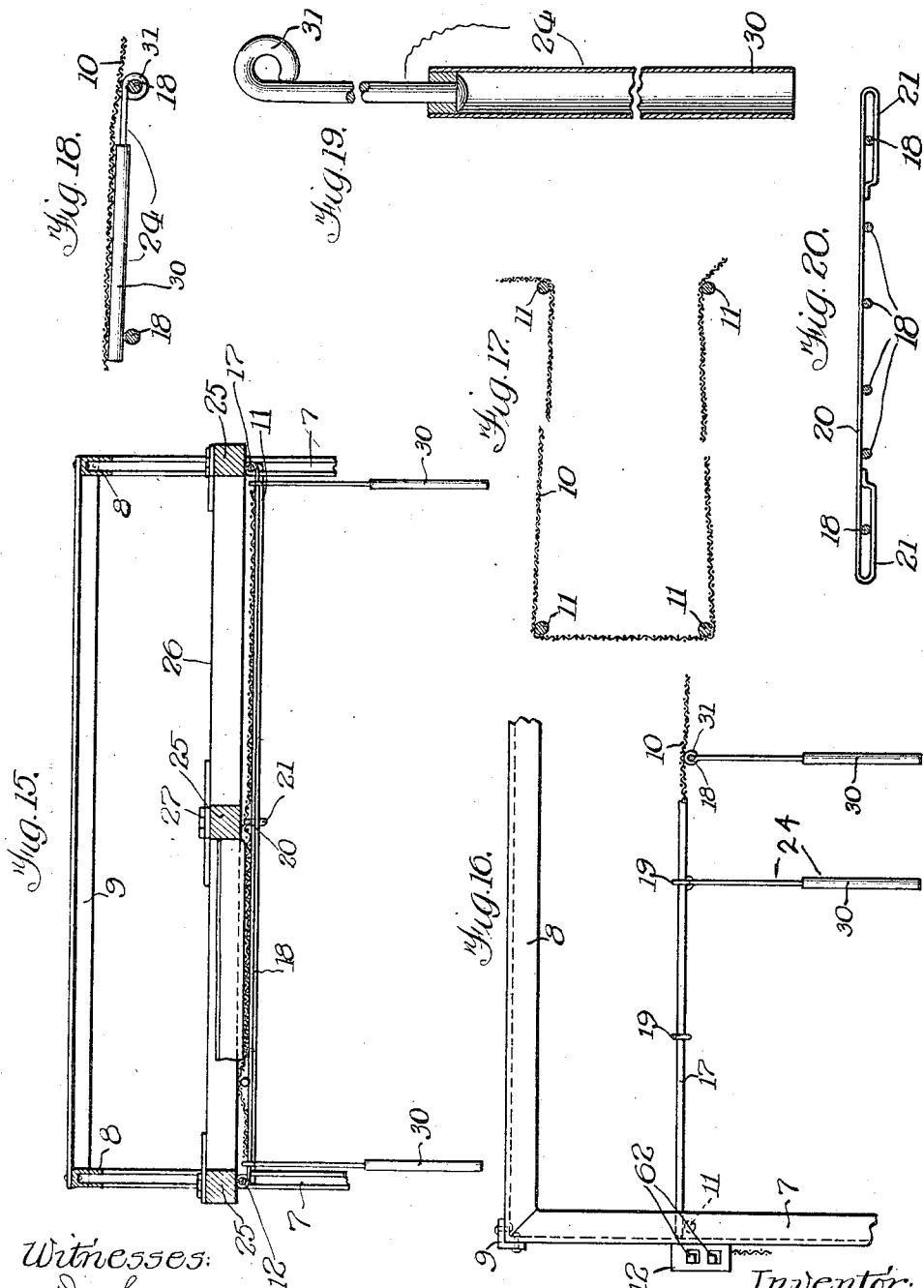

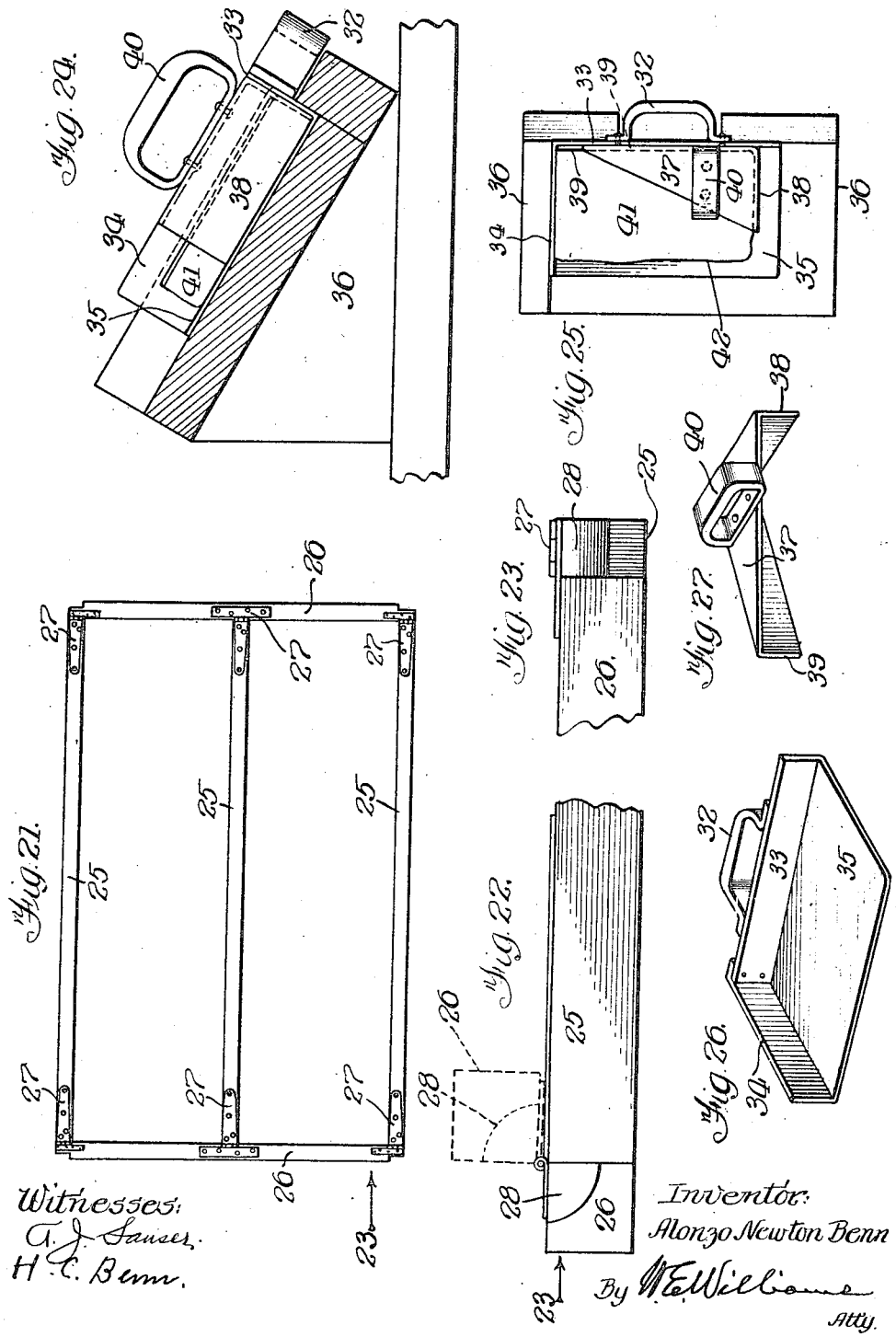

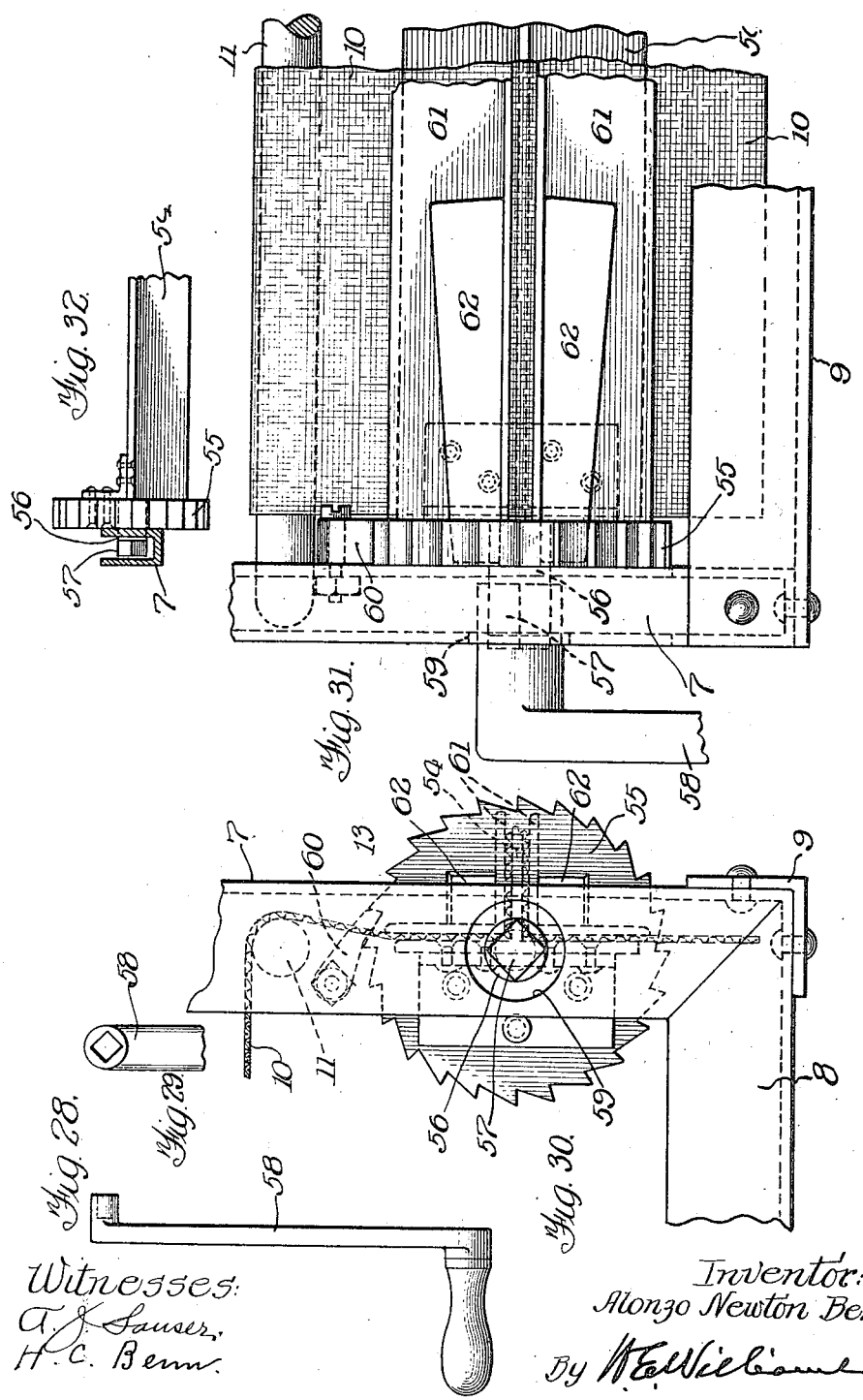

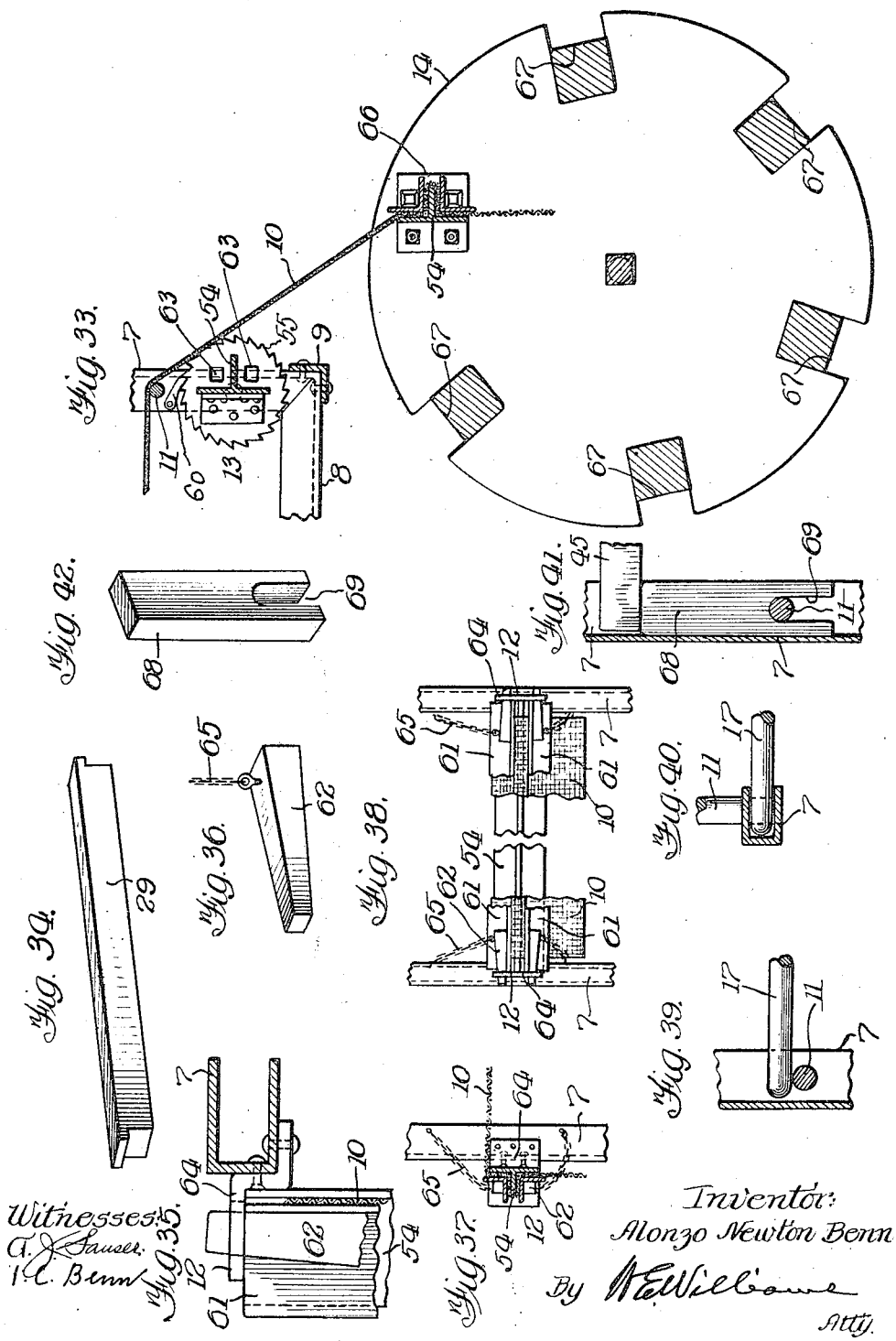

ALONZO NEWTON BENN, OF CHICAGO, ILLINOIS.

COMBINATION MEAT-SMOKING TROLLEY.

1,284,854.  Specification of Letters Patent.  Patented Nov. 12, 1918.

Application filed March 6, 1917. Serial No. 152,608.

*To all whom it may concern:*

Be it known that I, ALONZO NEWTON BENN, a citizen of the United States, residing at Chicago, in the county of Cook and the State of Illinois, have invented a new and useful Improvement in Combination Meat-Smoking Trolleys, of which the following is a specification.

In the handling of meats in the smoking processes, it is desirable and in fact almost essential in a general packing house to have carrying devices suitable for the whole range of work to be performed and be as free as possible from having extra apparatus on hand which is only applicable for special classes of work.

The meat that goes through the smoking processes, while varying in detail, in so far as the apparatus for handling it is concerned may be classed as hams, bacon and briskets.

The object of my invention is to provide a combination meat smoking trolley which with slight adjustments and minor variations in parts, will be adapted to handle the ordinary general work of smoking meats.

The devices which are commonly used for holding and carrying meats in smoking are called trolleys as a general term, because as a rule they are supported from an over-head rail by suitable rollers, thus permitting them to be moved into and out of the smoking chambers with convenience. In this respect my device is similar to others heretofore used and the invention relates to the construction of the frame-work and the parts which directly support the meat.

I provide a general frame or cage into which cross-bars, rollers and cloth supporting devices are mounted and so arranged as to form shelves and meat supports in a manner to permit free access of the smoking gases and at the same time support the meat in a manner to hold it in a shape desired that will secure a better product than has heretofore been obtained by the devices generally used.

Reference will be had to the accompanying drawings in which:

Figure 1 is a side elevation and Fig. 2 an end elevation of my trolley, with parts broken away, adjusted to receive bacon, and briskets and meats of these classes.

Fig. 3 is a plan sectional view on line 3—3 of Fig. 1 with parts broken away.

Fig. 4 is a side elevation of my trolley converted for carrying hams or meats of this class.

Fig. 5 is an end section of Fig. 4 on line 5—5.

Fig. 6 is a plan detail and Fig. 7 a perspective view of one of the frames used in supporting hams.

Fig. 8 is a top plan view of the trolley partly in section, one part showing the bacon supporting frame and the other part showing the frame indicated in Figs. 6 and 7.

Fig. 9 is a transverse sectional view showing details of the ham carrying devices.

Fig. 10 is a detail of one of the spring cloth adjusters.

Figs. 11 and 12 are details in connection with the parts shown in Fig. 10.

Figs. 13 and 14 show the connecting clevis which connects the trolley frame with the trolley carriage, the latter carrying the rollers which run on the over-head track.

Fig. 15 is a transverse sectional elevation showing the arrangements of a shelf when bacon is to be smoked.

Fig. 16 is a vertical elevation of the upper left-hand corner of my trolley frame when rigged for bacon.

Fig. 17 is a diagram showing the arrangement of the threading of my shelf cloths.

Fig. 18 is a detail showing the intermediate devices for supporting the cloth at its edges.

Fig. 19 is an enlarged sectional view of one of the cloth marginal supporting devices.

Fig. 20 is a transverse sectional detail showing the rod that supports the cloth longitudinally at the center of the shelf.

Fig. 21 is a plan of the frame used in placing the bacon on the shelves of the trolley.

Fig. 22 is an enlarged detail edge view of Fig. 21 at the left end thereof.

Fig. 23 is a view looking in the direction of the arrow 23 in Fig. 22.

Fig. 24 is a sectional elevation of a scoop or a placing device used in placing bacon on the trolley shelves.

Fig. 25 is a plan of Fig. 24 but on a smaller scale.

Figs. 26 and 27 are perspective views of parts shown in Fig. 25.

Figs. 28, 29, 30, 31 and 32 are details of the devices used in tightening and securing the cloth in the trolley frame and will be described later.

Fig. 33 is a sectional detail of parts shown and connected in the previous Figs. 28 to 32 inclusive.

Figs. 34, 35, 36, 37, 38, 39, 40, 41, 42 and 43 are details of construction which will be described later. Fig. 43 is located on the same sheet with Figs. 1 and 2.

In the drawings 1 indicates the over-head trolley rail, 2 the trolley carriage, 3 the trolley rollers and 4 the bolt connected to the clevis 5 attached to the central supporting cross-bars 6 of the frame-work of my trolley. See Figs. 1, 2, 5, 13 and 14. The mechanism thus far described is more or less common with other forms of trolleys.

The general frame-work of my trolley may be made in any suitable manner but I prefer to make it having four corner vertical members made of channel iron with the flanges extending inward, indicated by 7, with the longer top and bottom horizontal members also of channel iron as indicated by 8 and the shorter horizontal top and bottom members of angle iron as indicated by 9. This frame-work remains a constant factor and I build into it a system of shelves and meat supporting devices adapted to be adjusted to meet the requirements of the several classes of meat to be handled by the trolley.

In handling meats shaped in general outline more or less like hams, I provide means to hang them from the shanks or the smaller ends and also to support them underneath the butts, but when bacon, briskets and meats of a similar class are to be handled, the devices from which the ham shapes are hung are not used but I do use the supporting mechanism or its equivalent which supports the butts of the hams.

The supporting means for the bacon and briskets and the butts of the hams are what might be termed cloth shelves and I prefer to make these shelves out of a continuous piece of cloth supplied from a reel in the first instance and trained over and through suitable supporting devices and fastened at its ends. This cloth is indicated by 10 and while it may be any suitable cloth or fabric made of wire or fiber threads I prefer to use a light cheap cotton cloth. This cloth is trained back and forth around end rollers or rods 11 which are journaled in holes in the inner flanges of the vertical channel corner posts 7 as indicated by Figs. 39, 40 and 41. A diagram of the training of the cloth is shown in Fig. 17.

When bacon and briskets are to be carried by the trolleys the cloth becomes substantially what might be termed the sheeting of flat shelves but with hams or meats of more or less similar out-line the cloth becomes a series of small hammocks passing underneath the individual butts thereof.

After training the cloth through the supporting devices of the trolley I fasten the upper end of it by suitable clamping device indicated in general out-line by 12 in Figs. 1 and 4 and shown somewhat in detail in Figs. 35, 37 and 38 and this clamping device holds securely the end of the cloth to resist without slipping the full strength of the cloth. When the trolley is rigged to carry bacon the cloth must be drawn very tightly and I provide two sets of mechanisms for drawing this cloth tightly around the rollers 11 as before mentioned and they amount to what might be termed windlasses, one of them 13 secured to the trolley frame itself and the other 14 mounted on the floor or some convenient position accessible for the trolley when carried by its over-head rail. The floor device is used when the cloth is applied to the trolley frame in the first instance as in the case when new or clean cloths are being placed in a series of trolleys and the windlass 13 on the trolley itself, while it may be used the same as the windlass 14, yet it is carried by the trolley at all times and is available for tightening the cloth at any time when it is found necessary. When the windlass 14 which is stationary is used, the trolley itself must be held stationary to resist the pull of drawing the cloth on to the windlass 14 itself. For this purpose I provide some hooks 15, see Fig. 43 on the same sheet with Fig. 1, which engage the lower left hand corners of the trolley and are held in place by screw-eye 16 screwed into the floor or other stationary part of the building. These hooks together with the supporting trolley carriage permit the windlass 14 to be used in drawing the cloth tightly in position in the trolley frame. When the cloth is sufficiently taut it is secured by suitable clamps indicated in Figs. 30 and 31, which clamps are part of the windlass 13 and will be described in detail later on.

In using the trolleys for bacon and briskets it is arranged as is indicated by Figs. 1, 2, 3, 15, 16 and 17 and there is used in connection therewith the details shown in Figs. 21 to 27 inclusive.

Bacon and meats of a similar class when in condition ready for the smoking process are so soft and pliable that it is desirable and almost necessary to provide scoops of a special shape, what might be termed "peelers" as in the baking art, for placing the meat on the shelves of the trolley. Figs. 24 to 27 inclusive relate to devices of this character.

When placing the bacon on the shelves, it is necessary to shape it into a position of rest that will cause it to remain in that position during the smoking and drying, thus causing it to become more or less fixed into the most desirable finished form and to aid in this work of placing the bacon on the shelves in proper form I provide a removable frame shown in detail in Figs. 21 to 23 inclusive and in connection therewith I use some movable blocks of the shape shown by Fig. 34.

The cloth 10 after being tightly drawn in the frame to form the sheeting for the shelves, is further supported by the horizontal rods 17, the ends of which rest on the rollers 11 as indicated by Figs. 39 and 40 and cross-rods 18 passing transversely underneath the cloth 10 on the shelf surfaces and threaded on to rods 17 by suitable eyes 19 in a manner to be moved horizontally along the rods 17 to vary the spaces between the several rods 18. The rods 18 are intended to be spaced from each other about the width of the pieces of bacon supported on the cloth at each interval of use and thus the cloth itself will support without assistance the bacon only from rod 18 to rod 18. See Fig. 3. Running horizontally along the center of the shelf over the rods 18 and under the cloth there is a center rod 20 shown in detail in Fig. 20 and in dotted lines in Fig. 3. The ends 21 of this rod 20 are looped over as indicated in Fig. 20 to assist in holding the rod in position.

The bacon on the trolley is indicated by 22, see Fig. 3, and briskets by 23 in the same figure. Briskets are so irregular in out-line that little or no attempt is made to hold them in any given shape out-side of placing them in advantageous positions on the shelves but with the bacon I so modify the shapes of the several pieces in placing them on the shelves as to greatly improve the quality of the finished product handled by my trolley over and above the old-style methods.

By means of the adjustable rods 18 as before described I so place them that a rod runs substantially along under-neath the division length-wise between the several pieces of bacon 22 and I place one end of each piece of bacon at substantially the center of the shelf, thus making the horizontal rod 20 the division line length-wise of the shelf between the courses of bacon on the sides thereof and as the bacon varies in length I provide the intermediate supporting devices 24 to support the cloth immediately at the out-side ends of the bacon between the rods 18, thus causing each piece of bacon to be supported on what practically amounts to a framed section of the cloth the size of the bacon itself. This arrangement gives free access of the smoking gases and permits the use of more or less fragile open mesh cloth which protects the bacon without marking it and at the same time makes unnecessary the handling of small pieces of cloth or placing undue strain upon the cloth fabric itself.

Heretofore the methods generally employed in handling meats in the smoking process involved hanging same by ties or hangers of various kinds which held the pieces of meat in suspension from one end and thus the meat was damaged more or less by the ties or hangers and by the manner and position in which it was hung or suspended, the action of gravity on the soft meat distorting same so that irregularities in the out-line and shape of the meat took place in the early stages of the smoking process and as a result uneven shrinkage, cracking and distortion of the finished product came about during the smoking and drying. The meat suspended as indicated received more or less irregular treatment as relates to the different portions of each piece, the lower ends at times becoming badly over-smoked, frequently burning and cracking to such an extent as to seriously impair the general quality of the product.

Meats cured preparatory to smoking are quite soft and pliable and if proper supporting devices are provided the meat may be shaped on the supporting devices into the out-line desired for the finished product and it will then remain in such a position of repose during the smoking and drying process that the desired shape will become more or less fixed and consequently will be retained by the finished product, thus adding materially to its market value and I attain these results by the devices which I have herein shown.

In placing the bacon on my cloth shelves as described I mold or direct the shape of it on the shelves by means of the frame shown in Figs. 1, 2, 3, 15, 21, 22 and 23 in connection with a series of cross-bars indicated by Fig. 34. This frame is composed of the side and central bars 25 and end cross-bars 26, the latter being hinged by the hinges 27 to the bars 25. The ends of the bars 26 are rounded as indicated by 28 to permit them to be locked over to the dotted position shown in Fig. 22, thus as it were shortening the frame to permit its entry into the general frame-work of my trolley as is indicated in Figs. 1 and 15. This frame is placed in position on any given shelf preparatory to loading it with bacon and then the bacon is filled in by beginning at one end and working across the shelf, inserting one of the blocks 29 of Fig. 34 alongside of each piece of bacon as is indicated in Fig. 3. After the bacon is placed on the cloth of the shelf, the rod 18 corresponding to the locality of that piece of bacon is adjusted to fit the edge of the piece of bacon as desired and then a block 29 is placed on the cloth at the edge of the piece of bacon and crowded up tightly, thus compressing the bacon to a regular line in contact with block 29, giving the edge of the bacon a true out-line on three sides. The other or fourth side or end having been alined by the placing scoop or "peeler" used in placing the piece of bacon on the shelf. At this time one of the intermediate supporting devices 24 is swung horizontally in place supporting the cloth underneath the outer end of the piece of bacon placed as described.

These intermediate supporting devices 24 have telescoping tubular ends 30 sliding over rods provided with eyes 31 threaded on to rods 18 thereby adjustments may be made for varying widths of bacon as indicated in Fig. 3. These supporting devices 24 hang idle in vertical arrangement on the rods 18 when not in use. The shelves are filled with bacon progressively from one end and the blocks and rods are adjusted to suit the several pieces of bacon as they are placed upon the cloth of the shelves.

In filling the trolley with bacon I use the scoop shown in Fig. 26 provided with the handle 32 and having only the sides 33 and 34, leaving the bottom 35 open at the other two sides. The pieces of bacon are placed in this scoop when the latter is held in an inclined position in a supporting frame 36, see Figs. 24 and 25, and the piece of bacon in the scoop indicated at 41 is squared up against the sides 33 and 34 by hand pressure and by gravity and with the angular shaper 37, having the side walls 38 and 39 and the handle 40, I shape the other end of the piece of bacon, leaving only irregular edge 42 that is not lined up while the bacon is in the scoop. With the handle 32 I then move the scoop and its load of bacon to place it in position to deposit the bacon as 22 in Fig. 3, pressing the irregular edge 42 against the end members 26 or blocks 29, thus as it were squaring the bacon at all sides at the moment of contact of the scoop in placing the bacon on the shelves. When the scoop is properly placed with its load of bacon on the shelf, the bacon is discharged from the scoop with the angular shaper 37 holding the bacon in place while the scoop is withdrawn from under it by means of the handle 32 and then the shaping member 37 is removed and the block 29 inserted, thus completing the placing and shaping of a single piece of bacon on the shelf and the shelf is filled up piece by piece in like manner.

When any given shelf is properly filled with bacon the blocks 29 are removed and then the end pieces 26 of the frame are folded up as indicated by the dotted lines in Fig. 22 and the frame composed of the bars 25 and 26 is lifted up clear of the bacon and then withdrawn sidewise and removed for use in filling another shelf, thus one of these frames will serve to load many of my trolleys.

When the trolleys are to be used for carrying hams, the bacon cloth is first removed and then side rods 17, the cross-rods 18, central rod 20 and supports 24 are removed bodily from the main trolley frame by lifting them out as they are so arranged that they may be handled together while the parts are threaded on to each other as indicated.

I then place into the trolley frame my ham supporting frames shown by Fig. 7 composed of side-bars 43 and the cross-bars 44, the latter having the ends 45 shaped to enter in between the flanges of the channels 7 and rest on the rollers 11 in a similar manner to that of the rods 17 before described, see Figs. 4, 5, 6 and 7. Threaded on to the bars 43 are clips 46 perforated at 47 to hold the end links of chains 48 of the spring adjusters shown in Fig. 10. The chain 48 is connected to spring 49, which latter is connected to a ring or hook 50. Notches 51 in the bars 43 permit the chains 48 to be adjusted at various lengths as will be understood from Fig. 11.

In the use of the trolley for hams I provide rather narrow cloths, using as many cloths as there are rows of hams lengthwise of the trolley and these cloths are trained through and over the rollers 11 in a similar manner as for bacon but in addition they are threaded through the rings or hooks 50 at the intervals between the several hams as indicated by Figs. 4, 5 and 9.

The hams 52 are supported from the shanks by means of the fastenings 53 also connected to bars 43 at intervals between the spring adjusters. Thus the main weight of the hams falls upon the shanks, the cloth underneath the butts of the hams carrying only so much of the weight of the hams through the medium of the spring adjusters as is found necessary and desirable to shape and hold the butts of the hams in the desired form and to protect the hams from undue shrinking, burning, cracking or drying during the smoking process. The tension of the spring adjusters and the adjustments for holding the cloth permits the desired pressure to be applied to the bottom or butts of the hams and meats of a similar class to accomplish the shaping and molding of the butts thereof into the best form possible, and at the same time it permits free ventilation and circulation of the smoking gases on all sides of the meats.

A light flimsy cloth such as I find desirable to use is not easily secured to sustain the full strength of the body of the cloth in the manner that I need to sustain it without danger of ripping or tearing the cloth at the fastenings. I secure a safe fastening for the cloth with the fastening devices 12 and 13 by means of the details of the construction shown in Figs. 30, 31, 32, 33, 35, 37 and 38 wherein I provide a cross-member of T shape indicated by 54 which extends across the ends of the trolley frame. In the case of the fastenings 12 this T cross-bar is a fixture but in the case of the fastening 13 it becomes the axis or shaft of a windlass shown in detail in Figs. 30, 31, 32 and 33 and in this latter case it is fastened at one end to a ratchet 55 which has a trunnion end 56 journaled in a hole in one of the channel posts 7 of the trolley frame and is provided with a squared end 57 adapted to receive a wrench or crank handle 58. The end 57 is in retreat within the outer flange of the channel post 7 and an enlarged hole 59 in this flange permits the entry of the crank end to the squared end of the trunnion 56. A pawl 60 secures the ratchet 55 from return movement. To secure the cloth to the T bar 54 I provide the angle clamping bars 61 which are keyed in place by the wedged blocks 62 shown in perspective in Fig. 36 and are driven into the holes 63 in the ratchet 55 of the member 13 or in corresponding holes in other corresponding members, which in the case of the device 12 is a plate 64, see Figs. 35, 37 and 38. Chains 65 secure the keys or wedges 62 from being lost as relates to the fastening 12 but these chains are absent in the case of the fastening 13.

In the windlass 14, see Fig. 33, the corresponding fastenings for the cloth 10 to those shown in Fig. 12 are indicated by 66 and cross-bars 67 form the drum for this windlass for winding cloth thereon when desired.

In converting the trolley from the bacon requirements so that it will prove suitable for hams, the vertical spacing between the several rollers 11 may not always be the right height for the ham supporting frames. When this is found to be the case I provide blocks 68 shown in Figs. 41 and 42 which may be placed within the channel flanges of the posts 7 and astride of the rollers 11 by means of the slot 69 in the blocks and thus furnish support for the ends 45 of the ham supporting frame.

When fresh cloths are applied to the shelves of my trolleys I moisten or dampen the cloths for the following reasons, namely: When the cloth is made tight on the trolley at the time when the cloth is moist, the drying out of the cloth when in the smoking chamber will cause it to tighten to some extent and thus maintain a comparatively flat surface under the load of meat, to a greater extent than would otherwise be the case. When the fire for the smoking fumes is started, it is usually started with wood and this sometimes generates sparks which might accidentally come in contact with the cloth and if the cloth was thoroughly dry, the sparks might ignite it but with the dampened cloth this danger is lessened. After the fires have been well started they are smudged down with saw-dust or by other suitable means and less danger from sparks is therefore encountered. Further the meats will slide or slip in placing them more easily on a dampened or moist cloth than they will on a dry cloth.

To assist in dampening or moistening the cloth of my shelves I provide some water pipes 70 provided with nozzles 71 adapted to discharge a spray over the trolley from any source of supply under the control of valves 72, see Figs. 1 and 2.

The meats are placed in my trolley with the fleshy portions in contact with the cloth and while I may use a wire fabric for this cloth I prefer to use a fiber cloth preferably of a thin cheap grade for the bottom of my shelves, which protects the fleshy sides of the meats better than other materials and at the same time does not diminish the efficiency of the smoking and since I have provided the means and mechanism for a thin cotton cloth in form to become substantially flat shelves or small hammocks adapted to sustain the load necessary for the purposes indicated, the use of a fiber cloth becomes a distinct desideratum over and above the mere use of a mesh or foraminous material as may have been used for supporting food products in other situations.

Cotton cloths are cheap at first cost and they may be handled, washed, repaired and renewed with less expense and more convenience than is the case of wire mesh fabric of any sort.

The arrangement of the various rods and bars which I have shown and described as the frame work of shelves over which cloth is stretched to form the sheeting, may be likened unto skeleton framework or what might be termed skeleton shelves and I prefer to use the word skeleton as indicating in a broad sense the rods, bars, adjusters and supports herein described as lying underneath the cloth sheeting in the trolley and supporting the same.

What I claim is:

1. In a meat smoking trolley a skeleton frame-work in combination with a system of skeleton frame-work shelves adapted to be adjusted into and out of the frame-work and in varying positions of parts when in the frame-work and with a cloth adapted to be stretched through the frame-work and over the skeleton shelves for forming the sheeting of the shelves.

2. In a meat smoking trolley an out-lying supporting frame-work provided with adjustable removable shelves of skeleton outline in combination with cloth for forming the sheeting of the shelves and with means for securing the cloth in fixed relation to the frame-work whereby it becomes adapted to support loads upon it.

3. In a meat smoking trolley an outer rigid frame-work provided with a series of rollers or rods mounted approximately in level planes in the frame-work and adapted to sustain cloth trained over them; with a cloth sheeting trained over the rollers or rods and secured taut in the frame-work.

4. In a meat smoking trolley a load-sustaining frame-work adapted to support a series of adjustable shelves of skeleton construction, with a cloth sheeting adapted to cover the said adjustable shelves and held in place thereon.

5. In a meat smoking trolley a general supporting frame-work, a series of skeleton frame-work shelves composed of parts adapted to be adjusted in relation to each other to furnish systems of small frames having relation to variations in sizes of the meat to be supported thereon in combination with cloth mounted to cover the shelves and held in place thereon.

6. In a meat smoking trolley a load sustaining frame-work provided with a series of rollers mounted in and across the frame-work in a manner to permit the training of a continuous piece of cloth over the several rollers and across the frame-work in position to form shelves, with a cloth trained over the rollers and forming shelves and secured at its ends in the frame-work.

7. In a smoke-house trolley a sustaining frame-work provided with a series of rods or rollers forming as it were a cage with the bars horizontally disposed and adapted to support a cloth sheeting for shelves with fastening means for the cloth fixed to the frame-work and provided with adjusting devices whereby the surplus length of the cloth may be taken up by being drawn lengthwise of the cloth and over the rollers.

8. In a meat smoking trolley a main supporting frame-work provided with a series of rods or rollers horizontally disposed therein and adapted to sustain a cloth sheeting in horizontal position to form shelves; with a skeleton frame-work mounted underneath the cloth and adapted to be adjusted in relation to the several parts in a manner to form frames in an approximate relation to the sizes of the pieces of meat placed upon the cloth shelves.

9. In a meat smoking trolley a general frame-work provided with a series of horizontal frame-work shelves; with a cloth sheeting stretched over the shelves and held taut in position.

10. In a meat smoking trolley a main supporting frame-work provided with skeleton structure adapted to hold in the form of shelves a continuous piece of cloth sheeting in length sufficient to form a plurality of shelves; with a cloth sheeting in a continuous piece sufficient for a plurality of shelves arranged in the frame-work and with means for securing the ends of the cloth sheeting and drawing the same taut in the frame-work.

11. In a smoke-house trolley a main supporting frame-work in combination with a series of skeleton shelves composed of parts adjustable in relation to each other in a manner to fit the sizes approximately of the pieces of meat to be supported thereon.

12. In a smoke-house trolley a frame-work adapted to hold a fiber cloth sheeting in the form of shelves in a manner that a single continuous cloth forms a plurality of shelves and with fastening and tightening means for holding the cloth taut to assist in sustaining the load of meat to be supported thereon.

13. In a smoke-house trolley a frame-work adapted to hold a continuous cloth sheeting in the form of several shelves with a continuous piece of cloth running from shelf to shelf, a fastening means for one end of the cloth and a windlass means for the other end of the cloth whereby the windlass can be used to tighten the cloth throughout the surface of the several shelves.

14. In a meat supporting trolley a main supporting frame-work provided with a series of rollers mounted across the frame-work in a manner to support a cloth sheeting in the form of horizontal shelves, a cloth sheeting trained over the rollers for the sheeting for the shelves; with an adjustable collapsible and removable frame-work mounted underneath the cloth to assist the cloth in sustaining its load as a shelf.

15. In a meat smoking trolley a general sustaining frame-work adapted to carry a variety of meat, with adjustable collapsible and removable skeleton shelves for the purpose of varying the classes of meat to be carried by the main frame-work.

16. In a meat smoking trolley a general supporting frame-work, with adjustable collapsible and removable shelves, the latter being composed of rods in transverse relationship to each other and connected together by adjustable means whereby a series of frames varying in size may be secured as desired to fit the different sizes of the meat pieces to be carried by the shelves.

17. In a smoke-house trolley an out-lying general frame-work composed of channel-shaped sections and transverse rods or rollers, the latter being threaded through holes in the inner flanges only of the channel sections and adapted to support a cloth trained over them, with a cloth trained over the rollers or rods for the purpose of forming shelves.

18. A smoke-house trolley composed of an outer general supporting frame-work, transverse horizontal rods or rollers extending between the members of the frame-work and adapted to support a cloth trained over them in a manner to form shelves, a cloth trained over the rollers or rods for the purpose of forming the sheeting for the shelves;

with skeleton frame-work shelves adapted to be inserted and removed from the main frame and be supported on the transverse rods or rollers when in the frame and positioned underneath the cloth sheeting for the shelves.

19. In a smoke-house trolley a main frame-work provided with skeleton shelves, the latter made of a series of rods connected together by means of eyes or loops in the ends of some of the rods sliding over the main body of the other rods and thereby adjustable in a manner to form frames of varying sizes approximating the size of the different pieces of meat.

20. In a smoke-house trolley a general out-lying supporting frame-work adapted to carry a variety of shelves for varying classes of meats, cloth supporting devices mounted in the frame-work for the purpose of holding a cloth sheeting in position to form the sheeting as shelves, a continuous piece of cloth adapted to be trained through the frame-work in a manner to form sheeting for shelves, a fixed fastening means for one end of the cloth and a windlass for the other end fastened to and carried by the frame and means for securing the windlass in a fixed position as relates to holding the cloth from becoming loosened.

21. In a meat smoking trolley, a main supporting frame, a series of removable skeleton frame work shelves composed of bars adapted to hold meat in suspension therefrom, in combination with other removable skeleton frame work shelves adapted to support meat upon the cross rods of the shelves.

Signed in Chicago, in the State of Illinois and the county of Cook, this 3d day of March 1917.

ALONZO NEWTON BENN.

Witnesses:
    HARRIETT CONDEE BENN,
    JAMES E. CONLIN.

Copies of this patent may be obtained for five cents each, by addressing the "Commissioner of Patents, Washington, D. C."